(12) United States Patent
Taylor

(10) Patent No.: US 8,177,458 B2
(45) Date of Patent: May 15, 2012

(54) MECHANICALLY STABILIZED EARTH CONNECTION APPARATUS AND METHOD

(75) Inventor: Thomas P. Taylor, Colleyville, TX (US)

(73) Assignee: T & B Structural Systems, Inc., Ft. Worth, TX (US)

( * ) Notice: Subject to any disclaimer, the term of this patent is extended or adjusted under 35 U.S.C. 154(b) by 294 days.

(21) Appl. No.: 12/479,448

(22) Filed: Jun. 5, 2009

(65) Prior Publication Data

US 2010/0310322 A1    Dec. 9, 2010

(51) Int. Cl.
*E21D 20/00* (2006.01)
*F16B 21/00* (2006.01)
*F16B 21/09* (2006.01)
*E04B 2/00* (2006.01)

(52) U.S. Cl. ....... 405/262; 403/315; 403/324; 52/587.1; 405/259.1; 405/284

(58) Field of Classification Search ............... 405/259.1, 405/262, 284–286; 403/315–319, 324, 360; 224/519; 52/587.1; 280/504, 514
See application file for complete search history.

(56) References Cited

U.S. PATENT DOCUMENTS

| | | | | |
|---|---|---|---|---|
| 4,075,924 A * | 2/1978 | McSherry et al. | ............ | 411/112 |
| 4,968,186 A * | 11/1990 | Ogorchock | ............ | 405/262 |
| 5,044,833 A * | 9/1991 | Wilfiker | ............ | 405/267 |
| 5,749,680 A * | 5/1998 | Hilfiker et al. | ............ | 405/262 |
| 6,517,293 B2 * | 2/2003 | Taylor et al. | ............ | 405/302.4 |
| 6,793,436 B1 * | 9/2004 | Ruel et al. | ............ | 403/316 |
| 6,802,675 B2 * | 10/2004 | Timmons et al. | ............ | 405/284 |
| 6,939,087 B2 * | 9/2005 | Ruel | ............ | 405/286 |

* cited by examiner

*Primary Examiner* — David Bagnell
*Assistant Examiner* — Kyle Armstrong
(74) *Attorney, Agent, or Firm* — Edmonds & Nolte, PC

(57) ABSTRACT

A connection apparatus for connecting an earthen formation to a concrete facing of a mechanically stabilized earth (MSE) structure. The connection apparatus may include a soil reinforcing element configured to be coupled to a facing anchor having a pair of longitudinally extending portions connected by a transverse member, wherein the soil reinforcing element may be inserted into an opening created by the pair of longitudinally extending portions, seated near or adjacent to the transverse member, and be secured therein by means of a clasp. The connection apparatus allows the soil reinforcing element to swivel in at least one horizontal plane, thus being capable of avoiding obstructions in the MSE mass.

15 Claims, 9 Drawing Sheets

MECHANICALLY STABILIZED EARTH CONNECTION APPARATUS AND METHOD

BACKGROUND

Retaining wall structures that use horizontally positioned soil inclusions to reinforce an earth mass in combination with a facing element are referred to as Mechanically Stabilized Earth (MSE) structures. MSE structures can be used for various applications including retaining walls, bridge abutments, dams, seawalls, and dikes.

The basic MSE technology is a repetitive process where layers of backfill and horizontally placed soil reinforcing elements are positioned one atop the other until a desired height of the earthen structure is achieved. Typically, grid-like steel mats or welded wire mesh are used as earthen reinforcement elements. In most applications, the reinforcing mats consist of parallel transversely extending wires welded to parallel longitudinally extending wires, thus forming a grid-like mat or structure. Backfill material and the soil reinforcing mats are combined and compacted in series to form a solid earthen structure, taking the form of a standing earthen wall.

In some instances, a substantially vertical concrete wall may then be constructed a short distance from the standing earthen wall. The concrete wall not only serves as decorative architecture, but also prevents erosion at the face of the earthen wall. The soil reinforcing mats extending from the compacted backfill may then be attached directly to the back face of the vertical concrete wall. To facilitate the connection to the earthen formation, the concrete wall will frequently include a plurality of "facing anchors" either cast into or attached somehow to the back face of the concrete at predetermined and spaced-apart locations. Each facing anchor is typically positioned so as to correspond with and couple directly to an end of a soil reinforcing mat.

Via this attachment, outward movement and shifting of the concrete wall is significantly reduced. However, in cases were substantial shifting of the concrete facing occurs, facing anchors may be subject to shear stresses that result in anchor failure. Although there are several methods of attaching the soil reinforcing elements to the facing anchors, it remains desirable to find improved apparatus and methods offering less expensive alternatives and greater resistance to shear forces inherent in such structures.

SUMMARY

Embodiments of the disclosure may provide a connection apparatus for securing a facing to a soil reinforcing element. The connection apparatus may include a soil reinforcing element having a pair of adjacent longitudinal wires with horizontally extended converging portions, a stud having a first end attached to the horizontally extended converging portions, and a second end bent upwards and terminating at a head, a facing anchor having a pair of longitudinally extending portions connected by a transverse portion and disposed generally parallel to each other, the longitudinally extending portions having a clasping end and a panel end, wherein the clasping ends define an opening for receiving the second end of the stud and further define at least two corresponding clasping apertures, and a device having a first substantially horizontal segment configured to extend through the clasping apertures to secure the second end against separation from the opening between the longitudinally extending portions, wherein the stud and the attached soil reinforcing element are capable of swiveling in a horizontal plane.

Embodiments of the disclosure may further provide a facing anchor for securing a soil reinforcing element to a facing. The facing anchor may include a pair of vertically disposed and longitudinally extending portions having a clasping end and a panel end, wherein the longitudinally extending portions define an opening for receiving a vertical portion of the soil reinforcing element, a transverse portion disposed between and connecting the longitudinally extending portions, a pair of corresponding reinforcing apertures defined on the panel end, and a pair of corresponding clasping apertures defined on the clasping end, the clasping apertures being configured to receive a device to secure the vertical portion of the soil reinforcing element against separation from the opening, wherein the soil reinforcing element is capable of swiveling in a horizontal plane.

Embodiments of the disclosure may further provide a method of securing a facing to a soil reinforcing element. The method may include the steps of providing a soil reinforcing member having a pair of adjacent longitudinal wires with horizontally extended converging portions, providing a stud having a first end attached to the horizontally extended converging portions, and a second end bent upwards forming a vertical portion, wherein the vertical portion terminates at a head, inserting the vertical portion of the stud into an opening defined by a pair of longitudinally extending portions connected by a transverse portion and disposed generally parallel to each other, the longitudinally extending portions having a clasping end and a panel end, wherein the clasping ends define the opening and further define at least two corresponding clasping apertures, and extending a first horizontal segment of a device through the clasping apertures to secure the vertical portion of the stud against separation from the opening between the longitudinally extending portions, wherein the stud and the attached soil reinforcing member are capable of swiveling in a horizontal plane.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
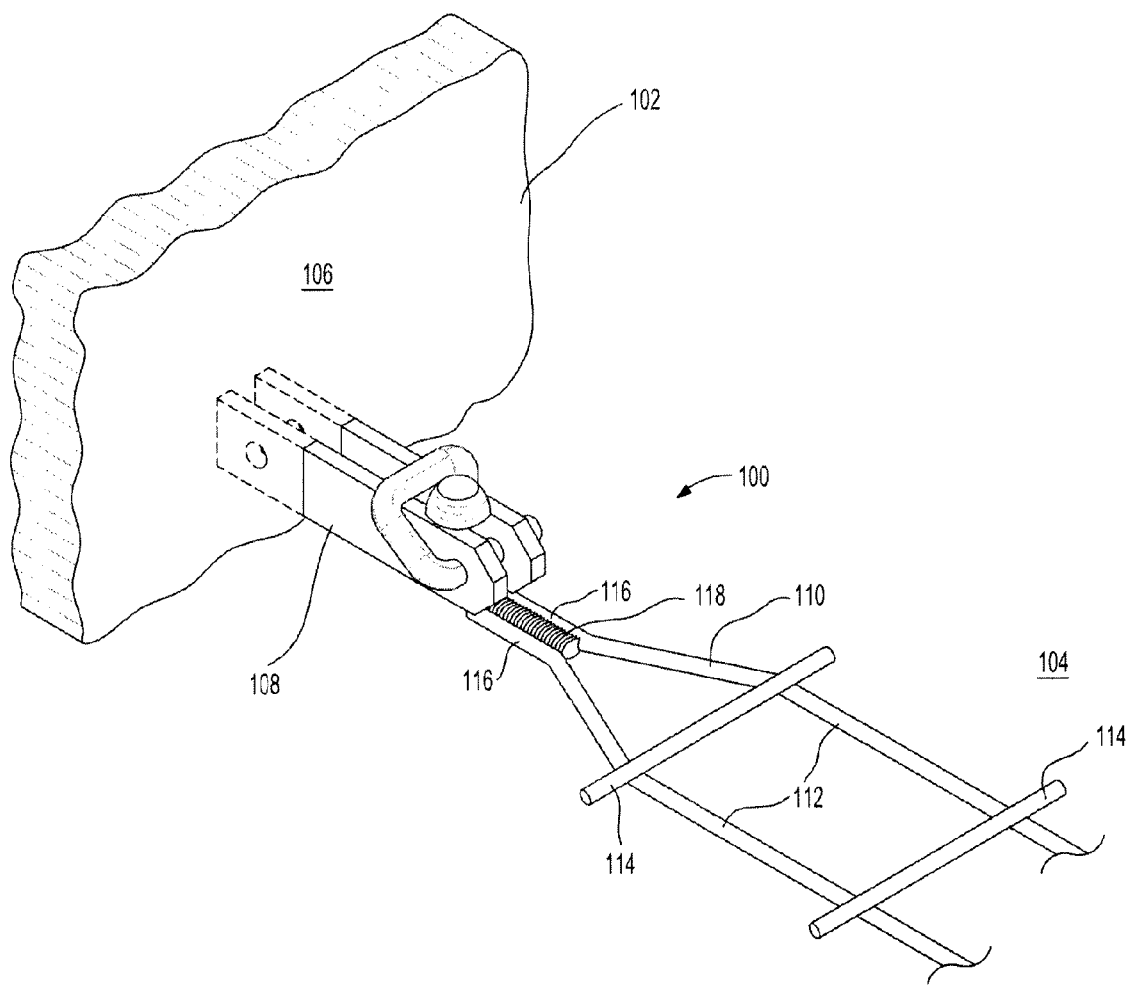
FIG. 1 illustrates an isometric view of an exemplary connection apparatus according to at least one aspect of the present disclosure.

It is to be understood that the following disclosure describes several exemplary embodiments for implementing different features, structures, or functions of the invention. Exemplary embodiments of components, arrangements, and configurations are described below to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope.

The present disclosure may be embodied as an improved apparatus and method of connecting an earthen formation to a concrete facing of a mechanically stabilized earth (MSE) structure. In particular, one improvement of the present disclosure is a low-cost one-piece MSE connector that allows soil reinforcing mats to swivel or translate in a horizontal plane to avoid vertically disposed obstructions, such as drainage pipes, catch basins, bridge piles, or bridge piers, that may be present in the backfill field. The present disclosure also contemplates the capability to shift and swivel in reaction to the settling and thermal expansion/contraction of an MSE structure. The ability to shift and swivel provides a distinct advantage as the structural integrity of the system is not thereby reduced, whereas in prior applications, certain modifications and alterations of the connection apparatus would occur, inevitably affecting the system performance adversely. A further improvement includes a soil reinforcing element that is easier to fabricate and ship and thus has less chance for damage during shipping. Besides these improvements resulting in the advantages described above, other advantages of the improved connector and facing anchor combination include its ease of manufacture and installation.

FIG. 1 illustrates an exemplary connection apparatus 100, according to one or more aspects of the present disclosure. In an exemplary embodiment, the apparatus 100 may be used to secure a concrete facing 102 to an earthen formation 104. The concrete facing 102 may include an individual precast concrete panel or, alternatively, a plurality of interlocking precast concrete modules or wall members that are assembled into interlocking relationship. In another embodiment, the precast concrete panels may be replaced with a uniform, unbroken expanse of concrete or the like which may be poured on site. The facing 102 may generally define an exposed face (not shown) and a back face 106. The exposed face typically includes a decorative architecture facing, while the back face 106 is located adjacent to the earthen formation 104. Cast into the facing 102, or attached thereto, and protruding generally from the back face 106, is at least one facing anchor 108.

The earthen formation 104 may encompass an MSE structure including a plurality of soil reinforcing elements 110 that extend horizontally into the earthen formation 104 to add tensile capacity thereto. In an exemplary embodiment, the soil reinforcing elements 110 may include tensile resisting elements positioned in the soil in a substantially horizontal alignment at spaced-apart relationships to one another against the compacted soil. Depending on the application, grid-like steel mats or welded wire mesh may be used as soil reinforcing elements 110, but it is not uncommon to employ "geogrids" made of plastic or other materials.

In the illustrated exemplary embodiment, the reinforcing element 110 may include a welded wire grid having a pair of longitudinal wires 112 that are substantially parallel to each other. The longitudinal wires 112 are joined to a plurality of transverse wires 114 in a generally perpendicular fashion by welds or other attachment means at their intersections, thus forming a welded wire gridworks. For example, instead of welds at the intersections, the longitudinal wires 112 may be coupled to the transverse wires 112 by rebar ties. In alternative embodiments, the transverse wires 114 need not be perpendicular but may be at other angles in relation to the longitudinal wires as long as the welded wire grid nonetheless serves its tensile resisting purpose. The lead ends 116 of the longitudinal wires 112 may generally converge toward one another and be welded to a connection stud 118. In exemplary embodiments, the spacing between each longitudinal wire 112 may be about 2 in., while spacing between each transverse wire 114 may be about 6 in. As can be appreciated, however, the spacing and configuration may vary depending on the mixture of force requirements that the reinforcing element 110 must resist.

Figure 2A:
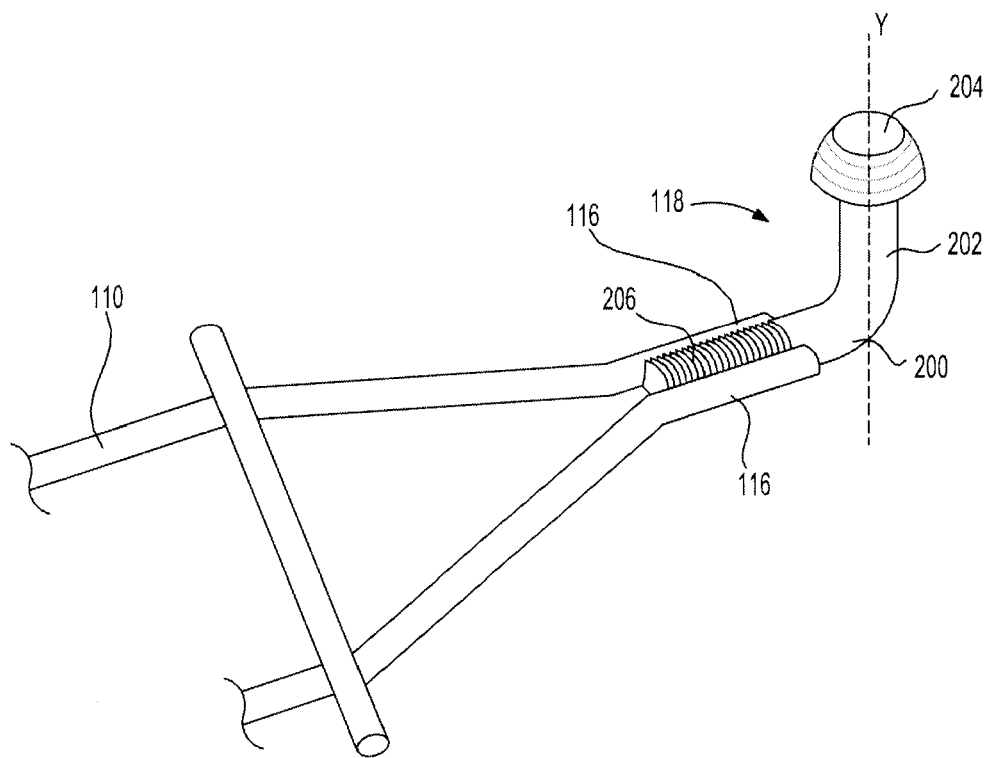
FIG. 2A illustrates an isometric view of a soil reinforcing element according to at least one aspect of the present disclosure.
Figure 2B:
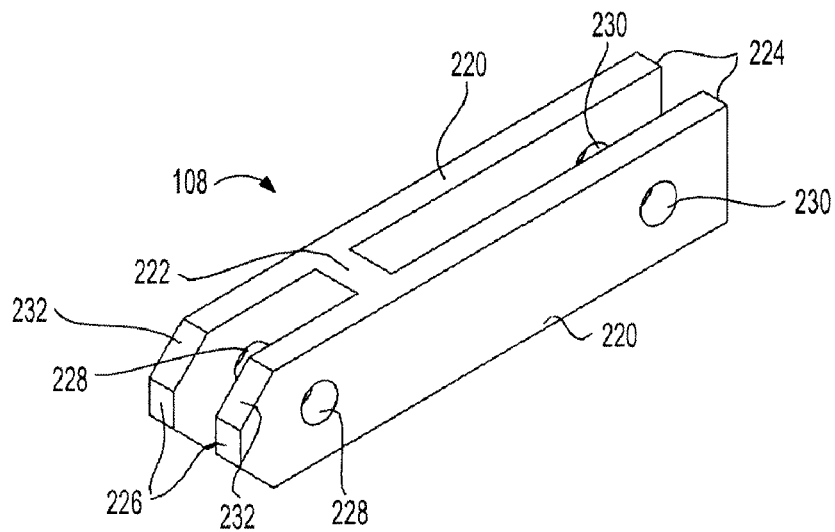
FIG. 2B illustrates an isometric view of an exemplary facing anchor according to at least one aspect of the present disclosure.
Figure 2C:
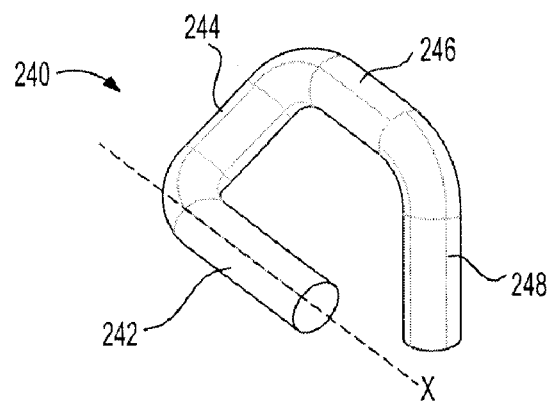
FIG. 2C illustrates an isometric view of a clasp according to at least one aspect of the present disclosure.

Referring now to FIGS. 2A-2C, various elements of the connection apparatus 100 are illustrated. As depicted in FIG. 2A, the connection stud 118 may include a cylindrical body 200 bent to about a 90° angle relative to horizontal, thus forming a vertical portion 202. In alternative exemplary embodiments, the angle may be more or less than 90° and still remain within the contemplated scope of this disclosure. As illustrated, the vertical portion 202 may terminate at a head 204 that is noticeably larger than the diameter or cross-section of the vertical portion 202. While it is not necessary, in some embodiments the head 204 may be beveled, as shown, for reasons that will be described below. The tail end 206 of the body 200 may include indentations or thread markings capable of providing a solid resistance weld, or other attachment means, to the leading ends 116. Alternatively, the leading ends 116 may be welded or otherwise coupled to a threaded nut (not shown) or similar device, wherein the threaded tail end 206 may threadably couple to the threaded nut.

FIG. 2B illustrates an exemplary facing anchor 108 according to at least one embodiment of the present disclosure. The facing anchor 108 may include a pair of vertically disposed and longitudinally extending portions 220 situated generally parallel to each other and connected by a transverse portion 222. The longitudinal portions 220 may each include a panel end 224 and a clasping end 226. The clasping ends 226 may be configured to extend substantially perpendicular from the back face 106 of a concrete facing 102 (FIG. 1), while the panel ends 224 may be configured to be embedded within the concrete facing 102. In alternative embodiments, the present disclosure contemplates the facing anchor 108 extending at various angles relative to the back facing 106 to fit any particular application.

The facing anchor 108 may be manufactured in several ways, including making the anchor 108 on site using two steel plates welded or otherwise coupled to an appropriate transverse member 222. However, unless the anchor 108 is fabricated using a jig, welding the facing anchor 108 may risk creating an anchor 108 with diverging longitudinal portions 220. Alternatively, the facing anchor 108 may be drop forged from a single piece of metal to provide a particularly strong anchor 108, and also to ensure that the longitudinal portions 220 maintain a generally parallel relationship. In a further alternative embodiment, explained with reference to FIGS. 9 and 10, the facing anchor 108 may consist of an unbroken length of continuous wire originating with a pair of lateral extensions embedded into the concrete facing 102 and forming a pair of vertically disposed loops that extend from the back face 106.

Still referring to FIG. 2B, the longitudinal portions 220 may also define at least two clasping apertures 228 and at least two reinforcing apertures 230, situated at the clasping ends 226 and panel ends 224, respectively. As illustrated, the clasping ends 226 may include beveled or pitched edges 232 that may serve to facilitate the installation and removal of a clasp (FIG. 2C), as explained in further detail below. Moreover, the clasping ends 226 may be beveled simply to reduce manufacturing costs, as a drop-forging process would then require less material to create the anchor 108.

While not necessary, the reinforcing apertures 230 may be configured to receive a length of round stock, rebar, or other similar material (not shown) before being cast into the back face 106 of the concrete panel 102 (FIG. 1). By implementing a length of rebar, more surface area is created for withstanding increased outward forces on the embedded portions of the anchor 108, thus increasing the overall pullout capacity of the anchor 108 from the panel and, in turn, increasing the rigidity and stability of the soil reinforcing element 110. In an exemplary embodiment, the length of rebar may be about 6 in. long, but can be longer or shorter depending on the application and the incident forces on the panel ends 224. In alternative applications, the length of rebar may be long enough to span a plurality of facing anchors 108 and be received into their respective reinforcing apertures 230, thereby potentially coupling a plurality embedded facing anchors 108 in a plurality of concrete panels 102.

Referring now to FIG. 2C, illustrated is a clasp 240 that may be configured as the means to secure a soil reinforcing elements 110 (FIG. 1) to a facing anchor 108 (FIG. 2B). In one embodiment, the clasp 240 may be manufactured from a continuous length of round-stock iron, plastic, or any similar material with sufficiently comparable tensile, shear, and compressive properties. The clasp 240 may originate with a first horizontal segment 242 configured to extend through the clasping apertures 228 of the clasping ends 226 (FIG. 2B). The first horizontal segment 242 may include an axis X of rotation about which the clasp 242 may rotate to lock or snap into place. At around a 90° angle relative to the first horizontal segment 242, a first vertical segment 244 may extend upwardly from the first horizontal segment 242 at about a 45° angle. At about a 90° angle relative to the first vertical segment 244, a second horizontal segment 246 may extend therefrom. When properly installed in the connection apparatus 100, the second horizontal segment 246 may be configured to extend across and rest on the top of the longitudinally extending portions 220 and behind the head 204 of the connection apparatus 100 (see FIGS. 3A and 3B). A second vertical segment 248 may extend substantially vertical at about a 90° angle relative to the second horizontal segment 246.

Figure 3A:
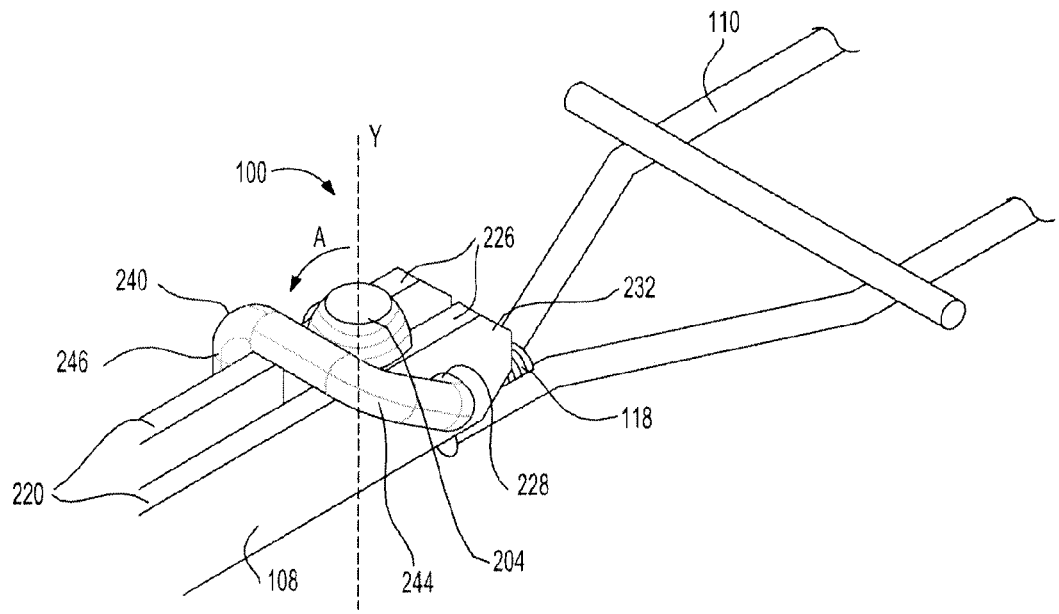
FIG. 3A-3B illustrate two isometric views of the connection apparatus as connected according to at least one aspect of the present disclosure.
Figure 3B:
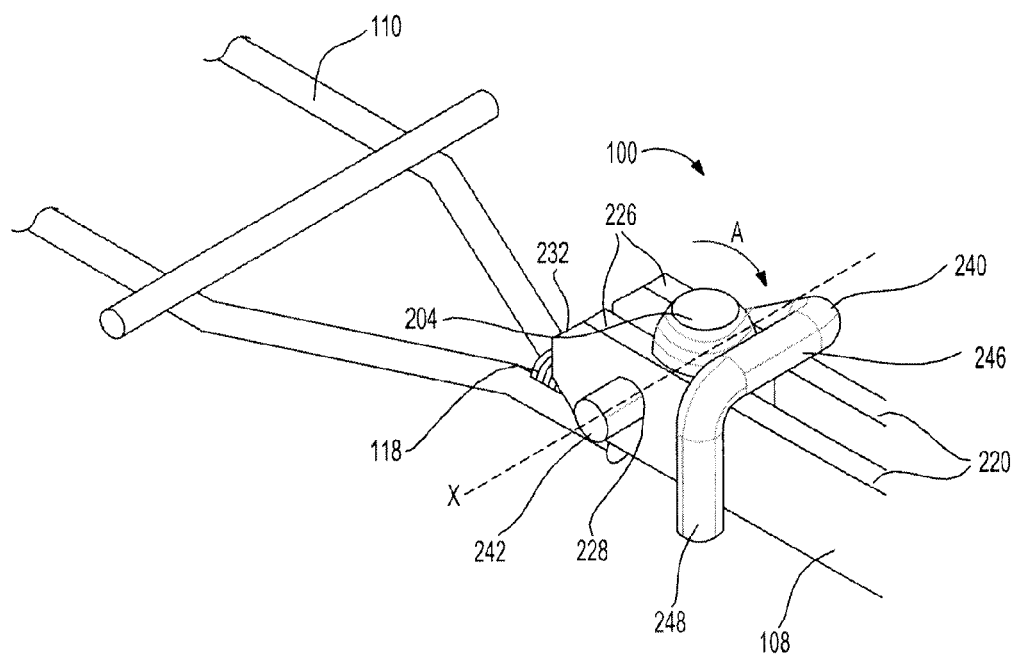

FIGS. 3A and 3B illustrate alternate isometric views of an exemplary assembled connection apparatus 100. In particular, a soil reinforcing element 110 is shown connected to a facing anchor 108 and secured in place by a clasp 240. To assemble the connection apparatus 100, the vertical portion 202 (FIG. 2A) of the connection stud 118 may be inserted between the longitudinally extending portions 220 at the clasping ends 226 until making contact with or being substantially adjacent to the transverse portion 222 (FIG. 2B). Since the head 204 of the connection stud 118 is enlarged, it may rest on the top of the longitudinal portions 220.

In prior applications that failed to employ a transverse portion 222 as described herein, the soil reinforcing element 110 would translate back and forth within an anchor slot during the compaction or settling processes of the MSE backfill soil 104 (FIG. 1). As is known in the art, compacting the soil serves to generate a shearing mechanism on the soil reinforcing element 110 required for a rigid connection to a wall. During compaction, however, the backfill soil 104 tends to spread out in all directions, potentially forcing random reinforcing elements 110 toward the back face 106 where they may indiscriminately force a few concrete panels 102 in an outward direction.

While some movement of the panels 102 is typically expected in MSE applications due to settling and compaction, according to the present disclosure the movement may be uniform within the expanse of the panels 102 that are stacked on top of each other. Specifically, according to the present disclosure, during compaction and settling the stacked soil reinforcing elements 110 will move or settle at the same rate. Thus, if there is movement of the soil 104 (FIG. 1), the whole of the face 102 will move uniformly. Limiting the movement as such may decrease the likelihood that a connected concrete panel 102 will buckle under an outward force triggered by a soil reinforcing element 110. Without a close-fitting connection as described herein, uneven stress distribution in some of the longitudinal wires 112 (FIG. 1) may result. The present disclosure, however, provides for an equal stress distribution at each connection point.

The connection is made secure by first extending the first horizontal segment 242 of the clasp 240 through the pair of clasping apertures 228 located on the clasping ends 226. To avoid creating an obstruction caused by the second vertical segment 248, and thereby preventing entry into the pair of clasping apertures 228, the second horizontal segment 246 may be initially positioned adjacent to the pitched edges 232, thus aligning the second vertical segment 248 above the longitudinal portions 220. Once the first horizontal segment 242 is fully extended through the pair of clasping apertures 228, the second horizontal segment 246 may then be pivoted in direction A about the axis X of the first horizontal segment 242, and lowered to the top of the longitudinal portions 220.

By accurately dimensioning the placement of the clasping apertures 228 with respect to the general position of the transverse portion 222 (FIG. 2B), the vertical portion 202 (FIG. 2A) of the connection stud 118 may be disposed substantially adjacent to both the first horizontal segment 242 and the transverse portion 222. In this arrangement, a slight amount of play may remain wherein the soil reinforcing element 110 may be allowed to swivel or rotate about axis Y (FIGS. 2A and 3A) in a respective horizontal plane. In an exemplary embodiment, about 0.125 to about 0.25 in. total amount of play may exist between the vertical portion 202 and the connection stud 118, and the vertical portion 202 and the transverse portion 222.

Rotation about axis Y may prove advantageous since it allows the connection apparatus 100 to be employed in areas where a vertical obstruction, such as a drainage pipe, catch basin, bridge pile, or bridge pier may be encountered in the MSE field. To avoid such obstructions, the soil reinforcing element 110 may swivel about axis Y to a location where no obstacle exists. Thus, the soil reinforcing element 110 may be attached at any angle relative to the back face 106. Furthermore, it is not uncommon for concrete facings 102 to shift and swivel in reaction to MSE settling or thermal expansion and contraction. Therefore, in instances where movement occurs, the soil reinforcements 110 are capable of shifting and swiveling correspondingly thereby preventing damage or misalignment to the concrete facing 102.

In an exemplary embodiment, the head 204 of the connection stud 118 may be beveled to allow the first horizontal segment 242 to rotatingly follow the beveled profile in order to seat the clasp 240 as close as possible to the vertical stud 202 (FIG. 2A). For example, the curved profile of the head 204 may be beveled in a manner that concentrically follows the axis of rotation about axis X of the first horizontal segment 242. Thus, the second horizontal segment 246 may be configured to rotatingly travel in direction A, ultimately along the beveled edge of the head 204, and snap into place against the head 204 thereby forming an interference fit between the clasp 240 and head 204. As can be appreciated, to accomplish an interference fit, a slight amount of elastic deformation may take place in the clasp 240 as the second horizontal segment 242 is constantly biased against the head 204.

Once seated properly, the first vertical segment 244 may be positioned at an upward angle (shown in FIG. 3A), while the second vertical segment 248 may be positioned substantially vertical (shown in FIG. 3B). Both vertical segments 244, 248 may be configured to prevent axial translation of the clasp 240 along the X axis, thereby maintaining a secure connection with the soil reinforcing element 110. For example, the first vertical segment 244 may be disposed against or substantially adjacent to one side of the longitudinal portions 220, while the second vertical segment 248 may be disposed against or substantially adjacent to the other side of the longitudinal portions 220. Furthermore, this engagement of the clasp 240 may also restrict potential forced separation of the longitudinal portions 220, thus ensuring a continuous parallel alignment during the useful life of the anchor 108.

It can be appreciated by those skilled in the art that the clasp 240 may be replaced with any device capable of providing similar securing capabilities as described above. For example, in an alternative exemplary embodiment, the clasp 240 may be replaced by a short length of round stock, rebar, or similar material. In exemplary operation, a length of rebar (not shown) may be inserted through the clasping apertures 228 to secure the vertical portion 202 in place. The rebar may then be bent at its ends to avoid removal thereof. Alternatively, the rebar may be replaced with a threaded rod (not shown) included in a nut and bolt arrangement. The rod may similarly secure the vertical portion 202 in place, and avoid removal by threadedly attaching a nut to one end. Similar embodiments are described below with reference to FIGS. 7 and 8.

Figure 4:
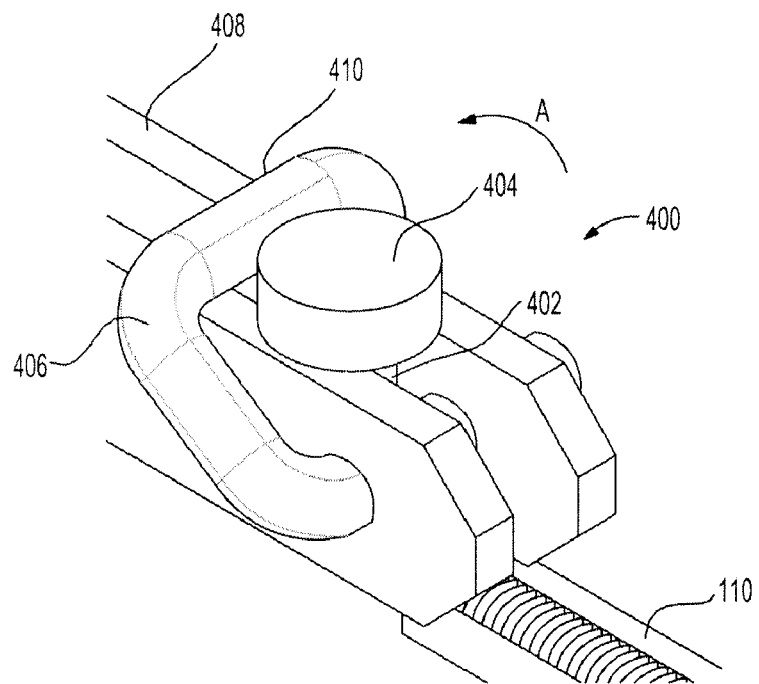
FIG. 4 illustrates an isometric view of an exemplary connection apparatus according to at least one aspect of the present disclosure.

Referring now to FIG. 4, illustrated is another exemplary connection apparatus 400 according to the present disclosure. In particular, the connection apparatus 400 may include an anchor 408 configured to receive a vertical portion 402 that terminates at a head 404, wherein the vertical portion 402 is coupled to a soil reinforcing element 110 as described above. In the illustrated exemplary embodiment, however, the anchor 408 may not necessarily include a transverse member (222 as shown in FIG. 2B) for restricting movement of the vertical portion 402 back and forth within the anchor 408, but instead may rely upon a clasp 406 to secure the vertical portion 402 and head 404 to the anchor 408. Similar to the embodiments described with reference to FIGS. 3A and 3B, the clasp 406 may be configured to secure the vertical portion 402 within the anchor 408 in a first direction, or away from the concrete facing 106 (FIG. 1). However, it is the second horizontal segment 410 of the clasp 406 that may serve to secure the head 404 against movement in a second direction, or towards the concrete panel 106. Thus, the second horizontal segment 410 may be configured to rotatably travel in direction A and snap into place against the head 404, thereby forming an interference fit between the clasp 406 and head 404. As can be appreciated, to accomplish an interference fit, a slight amount of elastic deformation may take place in the clasp 406 as the second horizontal segment 410 is constantly biased against the head 404.

As illustrated in FIG. 4, and equally and similarly applied to all other embodiments, the head 404 may be non-beveled, however, in alternative embodiments, the head 404 may be any shape, including beveled, hexagonal, or square. In at least one embodiment, the head 404 may be half beveled and half annular. In other words, the head may be beveled from the top of the head 404 to about half way down the head 404, with the remaining portion of the head 404 being annular and radially offset from axis Y (FIG. 3A). Thus, the clasp 406 may snap into place against the head 404 as described above, but allow for a slight amount of play when seated against the anchor 108, 408 where the annularly offset portion lies, thus allowing for the head 404 and soil reinforcing element 110 to swivel in at least one horizontal plane.

Figure 5:
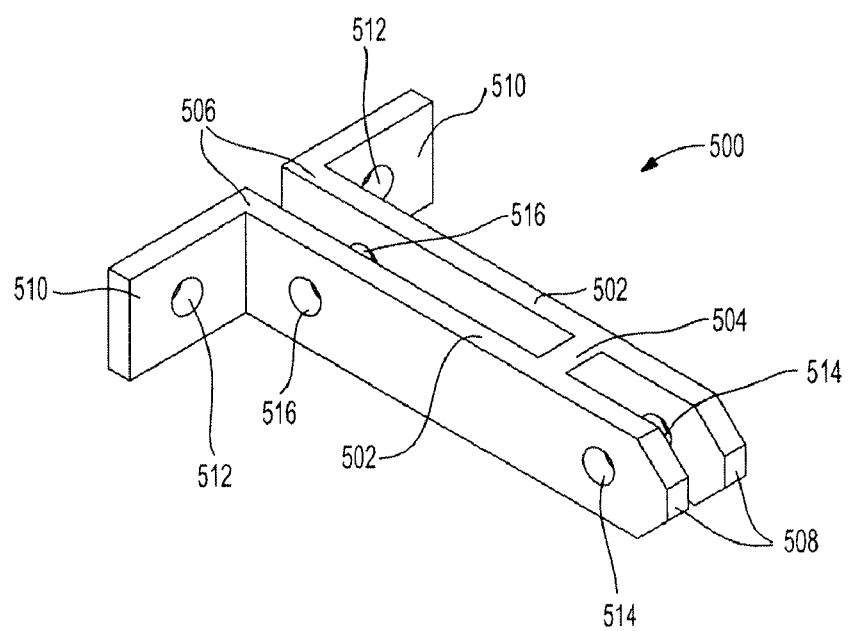
FIG. 5 illustrates an isometric view of an exemplary facing anchor according to at least one aspect of the present disclosure.

Referring to FIG. 5, illustrated is an exemplary facing anchor 500 according to at least one aspect of the present disclosure. Similar to the embodiments described above with reference to FIG. 2B, the facing anchor 500 may include a pair of vertically disposed and longitudinally extending portions 502 situated generally parallel to each other and connected by a transverse portion 504. The facing anchor 500 may be manufactured as described above; i.e., created on site, or shop fabricated, using two steel plates welded or otherwise coupled to an appropriate transverse member 504, or drop-forg out of a suitable material reflecting the appropriate tensile and compressive properties for the application.

The longitudinal portions 502 may each include a panel end 506 and a clasping end 508. The clasping ends 508 may be configured to extend substantially perpendicular from the back face 106 of a concrete facing 102 (FIG. 1), while the panel ends 506 may include tabs 510. The longitudinal portions 502 may also define at least two clasping apertures 514, and at least two reinforcing apertures 516, situated at the clasping ends 508 and panel ends 506, respectively. In at least one embodiment, similar to the embodiment described above with respect to FIG. 2B, the reinforcing apertures 516 may be configured to receive a length of rebar, or other similar material (not shown) before being cast into the back face 106 of the concrete panel 102 (FIG. 1) to increase the overall rigidity and stability of the facing anchor 500.

In an exemplary embodiment, the tabs 510 may be configured to be embedded within the concrete facing 102 to reinforce the rigidity and stability of the facing anchor 500 by providing additional pullout resistance to withstand increased outward forces on the embedded portions of the anchor 500.

In another exemplary embodiment, instead of being cast into a concrete facing 102, the exemplary facing anchor 500 may instead be mechanically fastened thereto. For example, each tab 510 may define at least one fastening aperture 512, respectively, whereby the facing anchor 500 may be mechanically fastened to the back face 106 of a concrete panel 102. A worker on an MSE construction site may drill holes in the back face 106 to coincide with the fastening apertures 512, and thereafter expansion anchors (or other suitable means) may be inserted into the drilled holes to bolt or otherwise couple the facing anchor 500 to the back face 106. As can be appreciated, this embodiment allows placement of the facing anchor 500 in any location along the expanse of the retaining wall, and anywhere soil reinforcement is needed. This embodiment may prove advantageous in applications where, as explained above, vertical obstructions (or any obstruction for that matter) are present in the MSE field 104 (FIG. 1) and the location of the facing anchor 500 needs to be adjusted to avoid the obstruction.

Figure 6:
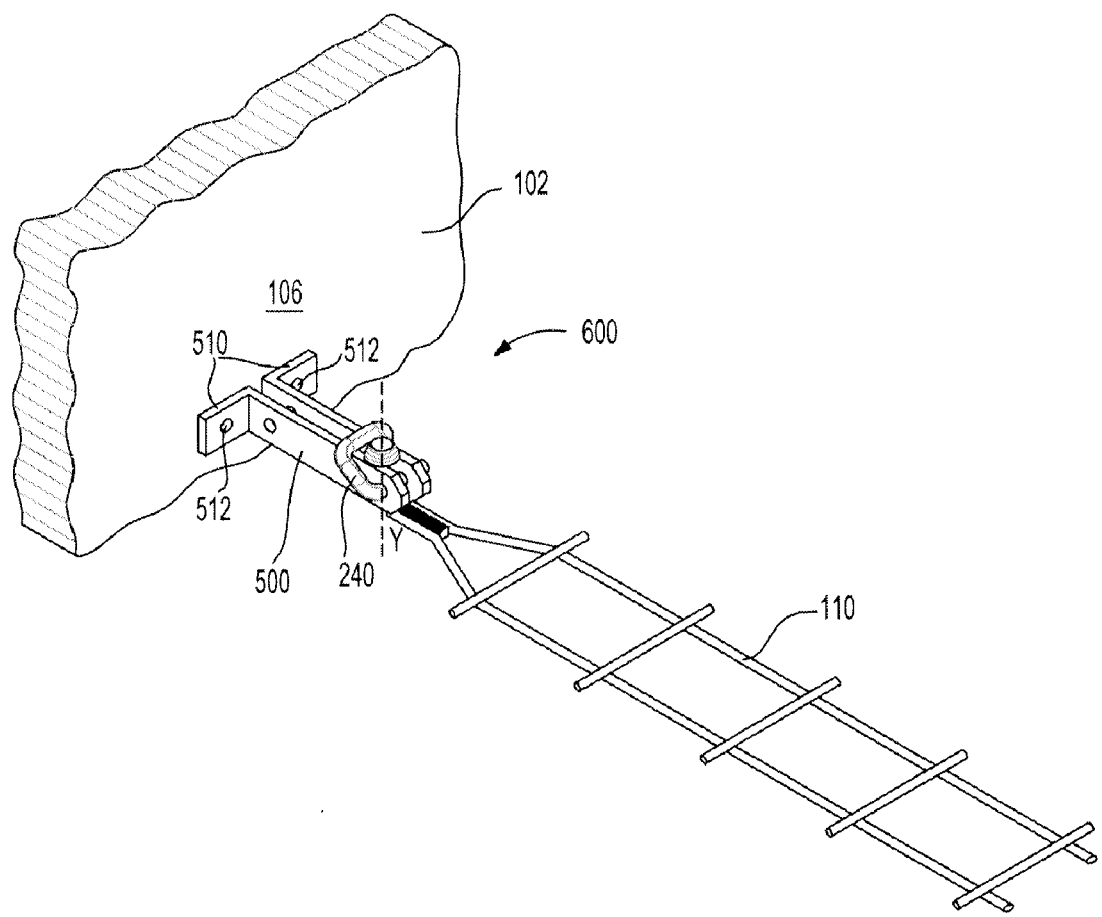
FIG. 6 illustrates an isometric view of an exemplary connection apparatus according to at least one aspect of the present disclosure.

Referring to FIG. 6, another exemplary connection apparatus 600 is shown wherein the panel anchor 500 as described in FIG. 5 is employed. In particular, the panel anchor 500 may be coupled or mechanically fastened to the back face 106 of a concrete facing 102 using the fastening apertures 512 defined on the tabs 510. Alternatively, as described above, the tabs 510 may be cast into the back face 106 to provide pullout resistance and tensile stability to the soil reinforcing element 110. As illustrated, the connection apparatus 600 may include a clasp 240 as described above. Similar to the embodiments described above, a slight amount of play in the connection apparatus 600 may remain wherein the soil reinforcing element 110 is allowed to swivel or rotate about axis Y in a respective horizontal plane.

Alternatively, the clasp 240 may be replaced by a short length of round stock, rebar, or similar material inserted through the clasping apertures 514 (FIG. 5) to secure the vertical portion 504 (FIG. 5) in place. If rebar is used, it may then be bent at its ends to avoid removal thereof. If a threaded rod, or nut and bolt arrangement is used, the rod may similarly secure the vertical portion 504 in place, and avoid removal by threadedly attaching a nut to one end.

Figure 7:
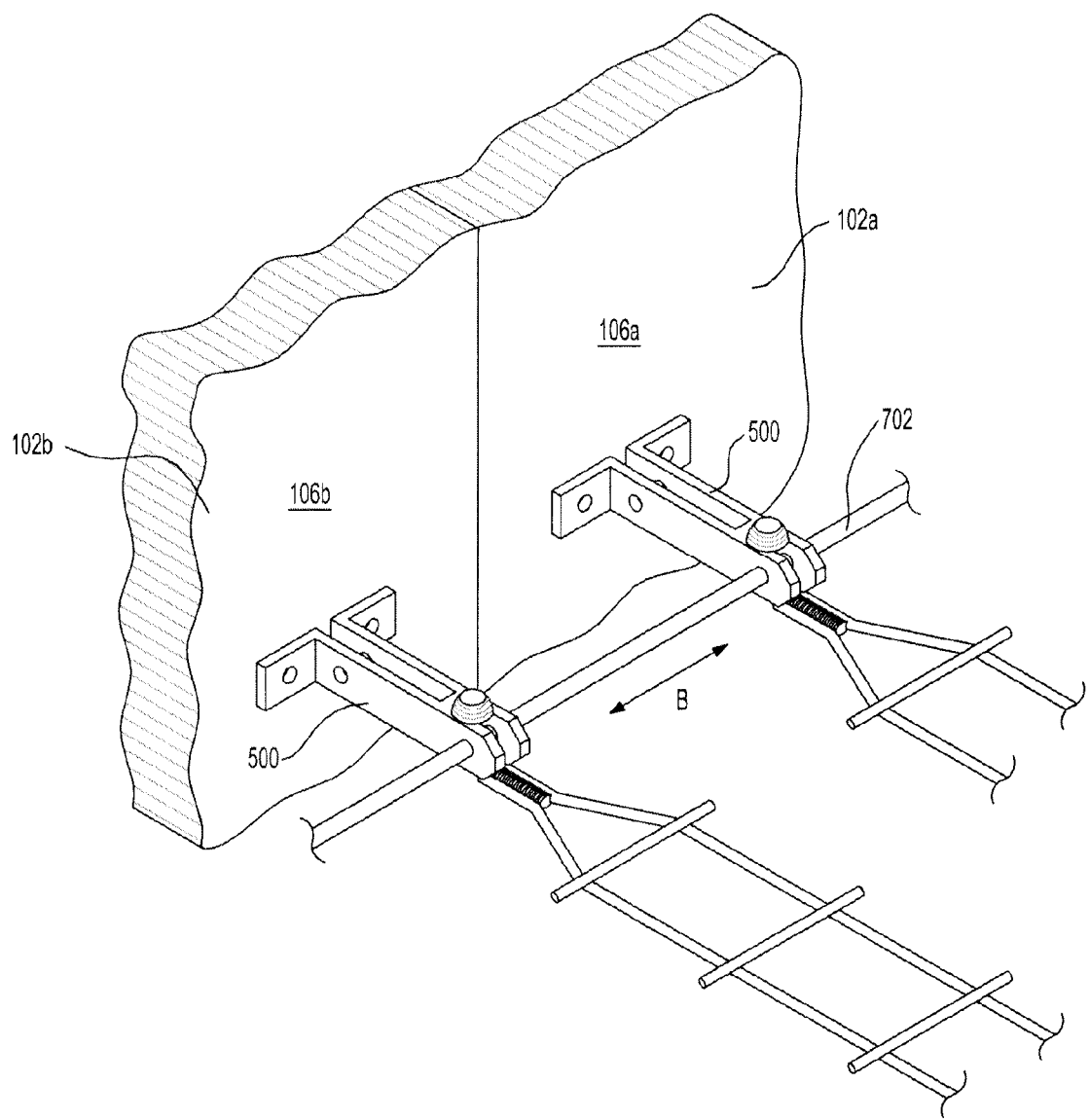
FIG. 7 illustrates an isometric view of a pair of connection apparatuses connected by a transverse rod according to at least one aspect of the present disclosure.

Referring to FIG. 7, illustrated is an exemplary embodiment where at least two facing anchors 500 are coupled together, thereby coupling at least two concrete panels 102a, 102b. In the illustrated embodiment, the facing anchors 500 may be mechanically fastened to the back faces 106a, 106b of the panels 102a, 102b, as described above, but alternatively they could be cast therein. As illustrated, an anchor pin 702 may replace the clasp 240 described in previous embodiments, and be inserted into the clasping apertures 228, 514 (FIGS. 2B and 5). In an exemplary embodiment, the anchor pin 702 may include round stock, rebar, a threaded rod, or similar mechanism conveying similar mechanical properties. To prevent removal of the anchor pin 702, the ends may be bent over (in the case of using rebar or round stock), or a nut may be threaded onto one end (in the case of using a threaded rod).

While not illustrated (nor required), the anchor pin 702 may be mechanically fastened or otherwise attached to the back faces 106a, 106b of the concrete panels 102a, 102b. Thus, a rail-like span may be created, upon which the anchors 500 may translate in direction B before being fastened to the concrete panels 102a, 102b. In other words, the anchors 500 may be strategically positioned along the back face 106a,b for optimal placement to avoid any number of obstructions that may be encountered in an MSE mass. Once positioned along the anchor pin 702 where desired, the anchor 500 may then be fastened to the concrete panel 102a, 102b. Besides being able to strategically place the anchors 500, the anchor pin 702 further bolsters the overall strength of the expanse of the concrete facing 102 by connecting multiple panels 102 together.

Figure 8:
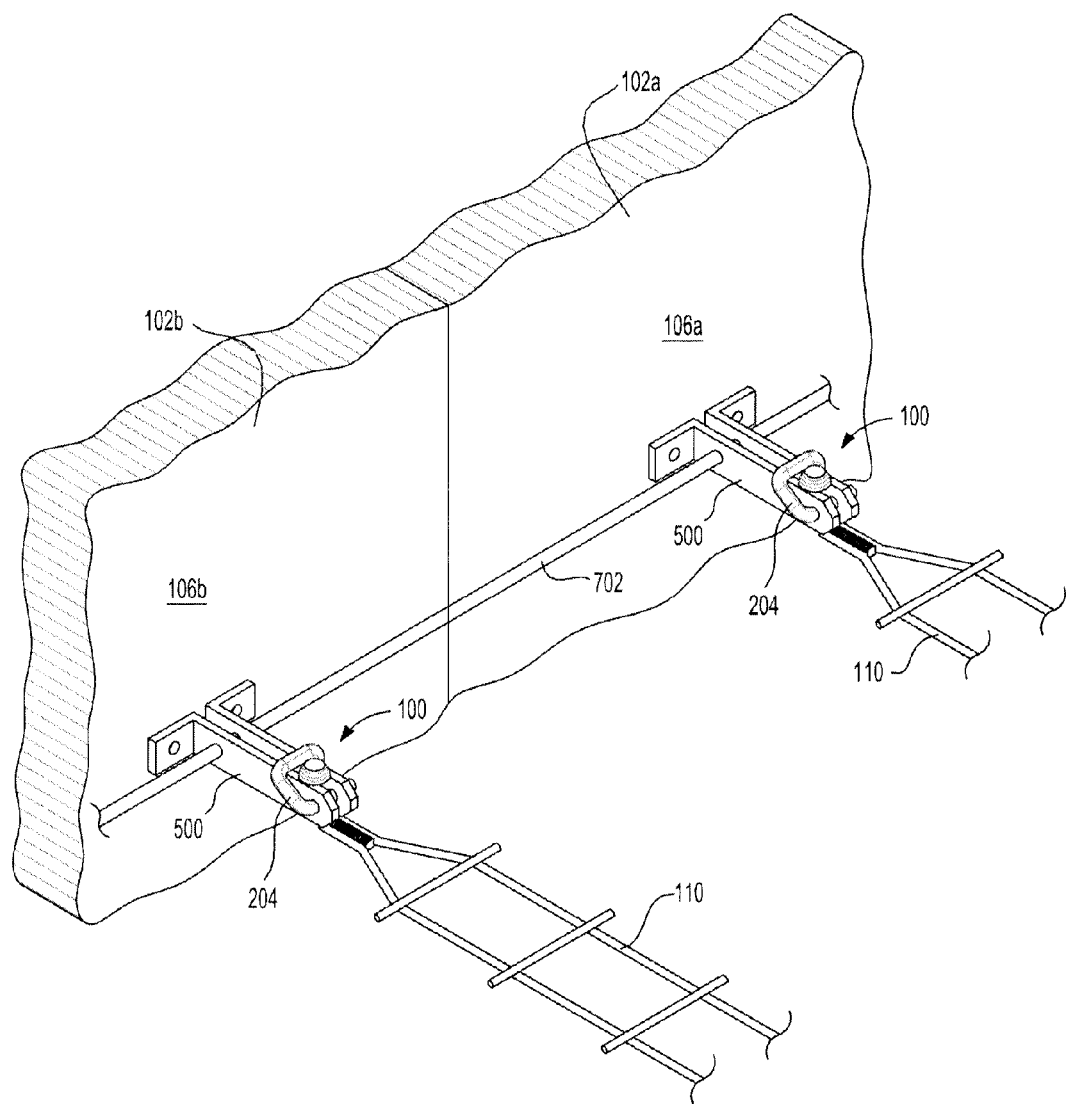
FIG. 8 illustrates an isometric view of a pair of connection apparatuses connected by a transverse rod according to at least one aspect of the present disclosure.

Referring to FIG. 8, an alternative exemplary embodiment employing an anchor pin 702 connecting at least two facing anchors 500 to at least two concrete panels 102a, 102b is illustrated. As shown, the connection apparatus 100, including a clasp 204, may be used to secure the facing anchors 500 to soil reinforcing elements 110. In the illustrated exemplary embodiment, the anchor pin 702 may be inserted into the reinforcing apertures 516 (FIG. 5) and function similarly as detailed in FIG. 7. In particular, the anchor pin 702 can be fastened to the back facing 106a, 106b and allow the facing anchors 500 to translate along its span until finding the optimal placement for the respective soil reinforcing element 110. Alternatively, the anchor pin 702 need not be fastened to the back face 106a, 106b, but may simply serve as a rail-guide for a plurality of anchors 500, thus coupling the anchors 500 in tandem and reinforcing the overall stability of the concrete walls 102.

Figure 9:
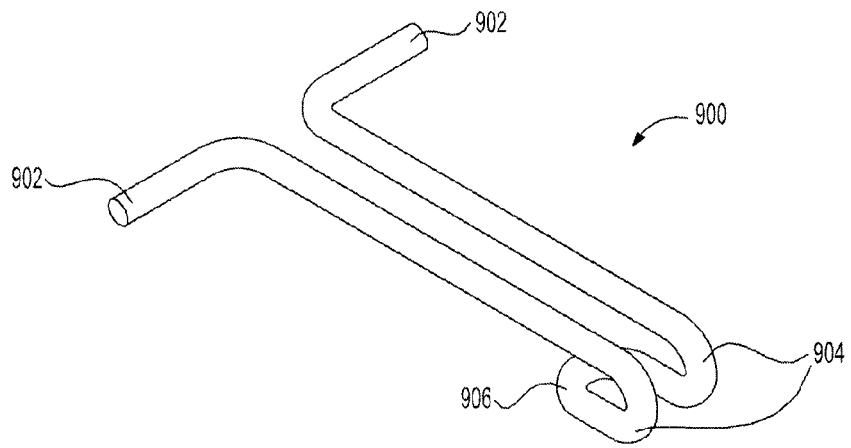
FIG. 9 illustrates an isometric view of an exemplary facing anchor according to at least one aspect of the present disclosure.

Referring to FIG. 9, illustrated is another exemplary facing anchor 900 according to at least one aspect of the present disclosure. As illustrated, the facing anchor 900 may consist of an unbroken length of continuous wire originating with a pair of lateral extensions 902, and forming a pair of vertically disposed loops 904 and a single horizontally disposed loop 906. As can be seen, the loops 904, 906 may be formed by making a series of 180° arcuate turns. The pair of lateral extensions may be configured to be embedded within the back face 106 of a concrete facing 102 (FIG. 10) to provide overall stability and rigidity to the anchor 900. The vertically disposed loops 904 and the horizontally disposed loop 906, however, may be configured to extend substantially perpendicular from the concrete facing 102, and couple to a soil reinforcing element 110, as will be described below. In alternative embodiments, the facing anchor 900 may extend from the concrete facing 102 at various angles to fit any particular application and yet remain within the scope of the present disclosure.

Figure 10:
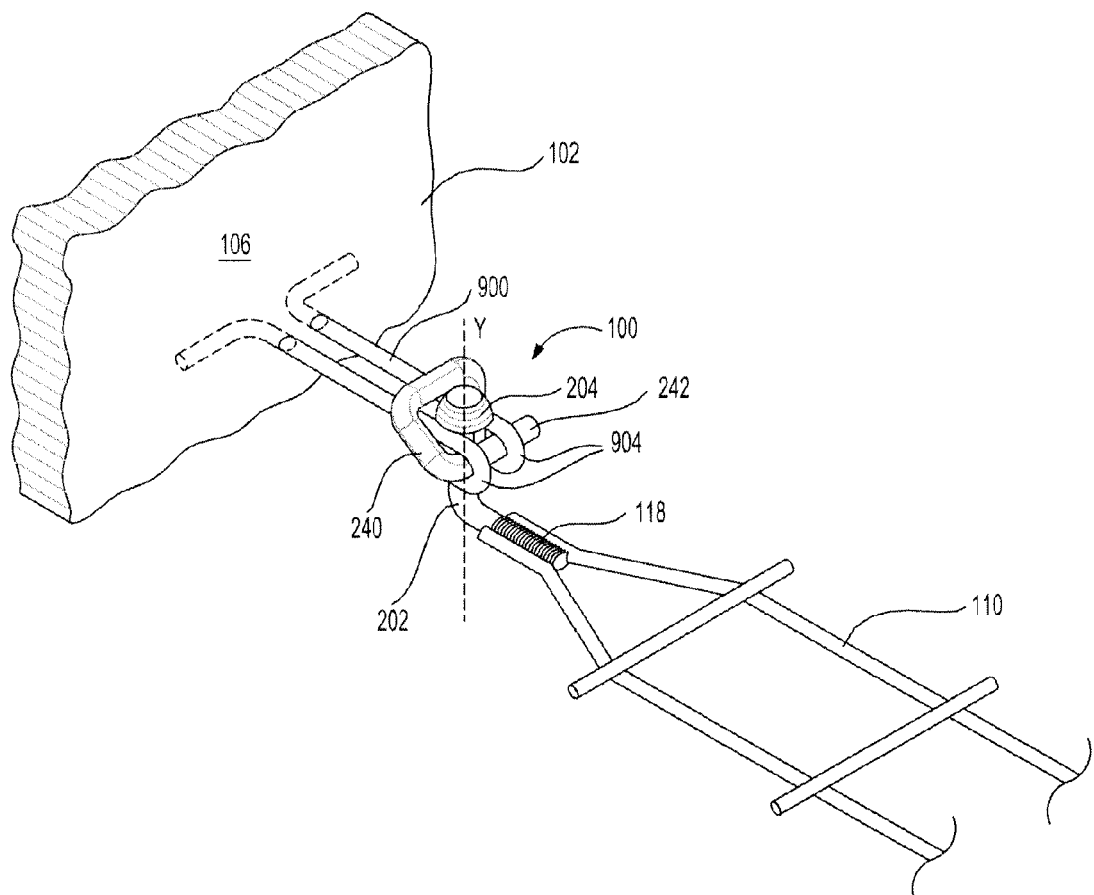
FIG. 10 illustrates an isometric view of an exemplary connection apparatus according to at least one aspect of the present disclosure.

Referring to FIG. 10, another exemplary connection apparatus 100 is shown wherein the panel anchor 900 as described in FIG. 9 is employed. In particular, the panel anchor 900 may be embedded into the back face 106 of a concrete facing 102 and connect to a soil reinforcing element 110 similar to the embodiments described above. To assemble the connection apparatus 100 as shown, the vertical portion 202 of the connection stud 118 may be inserted between the vertically disposed loops 904 of the facing anchor 900 until making contact with or being substantially adjacent to the horizontally disposed loop 906 (see FIG. 9).

Similar to the embodiments described with reference to FIGS. 3A and 3B, the connection may be made secure by employing a clasp 240, wherein first horizontal segment 242 of the clasp 240 is extended through the pair of vertically disposed loops 904, as illustrated. By accurately dimensioning the placement of the horizontally disposed loop 906 with respect to the general position of the vertically disposed loops 904, the vertical portion 202 of the connection stud 118 may be disposed substantially adjacent to both the first horizontal segment 242 and the horizontally disposed loop 906. In this arrangement, a slight amount of play may remain wherein the vertical portion 202 is allowed to swivel or rotate about its axis Y in a respective horizontal plane, and yet maintain a secure hold on the soil reinforcing element 110. As described above, rotation about axis Y not only allows the connection apparatus 100 to swivel during the settling or compaction processes without adversely affecting the concrete facing 102, but it also allows the connection apparatus 100 to be employed in areas where a vertical obstruction is present.

It can be appreciated that an anchor pin 702, as described in FIG. 7, may alternatively replace the clasp 240 and instead be inserted into the vertically disposed loops 904. In fact, exemplary embodiments of the present disclosure further contemplate an exemplary anchor pin 702 configured to connect a plurality of facing anchors 900 along the span of the back face 106 of the concrete panels 102.

It is not outside the spirit of the present disclosure to manipulate and alter the particular embodiments disclosed herein to fit a particular application. For example, as can be appreciated, any combination of anchor pin 702, clasp 204, rebar/bar stock, or facing anchor 108, 500, 900 may be used and still be contemplated within the present disclosure. In varying embodiments, the facing anchors 108, 500 may or may not be embedded into the back face 106. Where embedded, however, the anchors 108, 500 may or may not include a length of reinforcing round stock or rebar inserted into the reinforcing apertures 230, 516, or vertically disposed loop 904 for increased rigidity. Varying exemplary embodiments may additionally include a combination of two anchor pins 702, where one is inserted into the clasping apertures 228, 514 and another is concurrently inserted into the reinforcing apertures 230, 516. Therefore, any number of combinations of the above-described embodiments may be implemented and maintain within the scope of the present disclosure.

In the exemplary embodiments disclosed herein, however, the translation of the soil reinforcing element 110 toward and/or away from the concrete panel 102 may be limited as a result of being biased against the transverse member 222, 504 (FIGS. 2B and 5, respectively), or horizontally disposed loop 906, on one side, and either a clasp 204 or similar mechanism on the other side.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

I claim:

1. A connection apparatus for securing a facing to a soil reinforcing element, comprising:
    a stud having a first end attached to horizontally extended converging portions of the soil reinforcing element, and a second end bent upwards and terminating at a head;
    a facing anchor having a pair of vertically disposed and longitudinally extending portions connected by a transverse portion and disposed substantially parallel to each other, the longitudinally extending portions each having a clasping end and a panel end, where the clasping ends provide an opening for receiving the second end of the stud and define two corresponding clasping apertures; and
    a clasp having a first horizontal segment extendable through the clasping apertures to maintain the second end adjacent the transverse portion, and a second horizontal segment that rests on the longitudinally extending portions and engages the head, wherein the stud and the attached soil reinforcing element are capable of swiveling in a horizontal plane.

2. The connection apparatus of claim 1, wherein the head of the stud is hexagonal.

3. The connection apparatus of claim 1, wherein the head of the stud is beveled having a curved profile.

4. The connection apparatus of claim 3, wherein the clasp is configured to rotatingly travel along the curved profile and form an interference fit between the clasp and the head.

5. The connection apparatus of claim 1, wherein the panel ends of the longitudinally extending portions are cast within the facing and define at least two corresponding reinforcing apertures.

6. The connection apparatus of claim 5, wherein the at least two reinforcing apertures are configured to receive a rod.

7. A method of securing a facing to a soil reinforcing element, comprising:
    inserting a vertical portion of a stud into an opening defined by a pair of longitudinal portions of an anchor, the longitudinal portions being connected by a transverse portion and having a clasping end that defines the opening and at least two corresponding clasping apertures, wherein the stud is attached to the soil reinforcing element and the vertical portion terminates at a head;
    extending a first horizontal segment of a clasp through the clasping apertures to secure the vertical portion of the stud against removal from the opening and to maintain the vertical portion adjacent the transverse portion;
    rotating the clasp about an axis of rotation of the first horizontal segment such that a second horizontal segment of the clasp engages a top section of each longitudinal portion; and
    engaging the head with the second horizontal segment.

8. The method of claim 7, wherein the head of the stud is beveled having a curved profile.

9. The method of claim 8, wherein engaging the head with the second horizontal segment further comprises forming an interference fit between the clasp and the head.

10. The method of claim 7, further comprising resting the head of the vertical portion on the top section of each longitudinal portion.

11. A method of securing a facing to a soil reinforcing element, comprising:
    providing a stud coupled to the soil reinforcing element and having a vertical portion that terminates at a head;

providing an anchor having a pair of vertically-disposed longitudinal plates coupled together with a transverse plate portion, the longitudinal plates defining an opening and corresponding clasping apertures at a clasping end of the anchor and tabs that extend substantially perpendicular from each longitudinal plate at a panel end of the anchor;

inserting the vertical portion of the stud into the opening defined by the longitudinal plates until the vertical portion is adjacent the transverse plate portion;

extending a first horizontal segment of a clasp through the clasping apertures to secure the vertical portion of the stud against removal from the opening and to maintain the vertical portion adjacent the transverse plate portion; and attaching the anchor to a back face of the facing.

12. The method of claim 11, further comprising resting the head of the vertical portion on the top section of each longitudinal plate.

13. The method of claim 11, further comprising rotating the clasp about an axis of rotation of the first horizontal segment such that a second horizontal segment of the clasp engages a top section of each longitudinal plate and rests adjacent the head.

14. The method of claim 13, further comprising forming an interference fit between the head and the second horizontal segment.

15. The method of claim 11, wherein attaching the anchor to the back face of the facing comprises mechanically-fastening the anchor to the back face using fastening apertures defined in the tabs that extend from each longitudinal plate at the panel end of the anchor.

* * * * *